United States Patent
Varney et al.

(10) Patent No.: US 8,087,624 B2
(45) Date of Patent: Jan. 3, 2012

(54) FLAT SCREEN TELEVISION LOCK

(75) Inventors: Jim R. Varney, Manyard, MA (US); Bryan R. Hotaling, Harvard, MA (US); John MacNeill, Acton, MA (US)

(73) Assignee: Cosco Management, Inc., Wilmington, DE (US)

( * ) Notice: Subject to any disclaimer, the term of this patent is extended or adjusted under 35 U.S.C. 154(b) by 491 days.

(21) Appl. No.: 12/259,150

(22) Filed: Oct. 27, 2008

(65) Prior Publication Data

US 2010/0101284 A1    Apr. 29, 2010

(51) Int. Cl.
F16M 11/00    (2006.01)
(52) U.S. Cl. .................... 248/125.8; 248/917
(58) Field of Classification Search ............ 248/125.8, 248/122.1, 274.1, 279.1, 287.1, 298.1, 326, 248/917; 361/679.29; 70/57
See application file for complete search history.

(56) References Cited

U.S. PATENT DOCUMENTS

| | | | |
|---|---|---|---|
| 1,815,928 A | 7/1931 | Murphy | |
| 3,574,981 A | 4/1971 | Henschen | |
| 3,998,294 A | 12/1976 | Moeller | |
| 4,074,883 A | 2/1978 | Daly et al. | |
| 4,151,971 A | 5/1979 | Daly | |
| 4,304,078 A | 12/1981 | Meriwether, Jr. | |
| 4,503,981 A | 3/1985 | Coronado | |
| 5,042,766 A | 8/1991 | Baker | |
| 5,201,896 A * | 4/1993 | Kruszewski | 248/278.1 |
| 5,839,303 A | 11/1998 | Umberg et al. | |
| 6,478,275 B1 | 11/2002 | Huang | |
| 6,702,130 B1 | 3/2004 | Carlilse | |
| 6,854,222 B2 | 2/2005 | Hansort | |
| 6,957,515 B1 | 10/2005 | Hatfield | |
| 6,976,663 B1 | 12/2005 | Faulk | |
| 7,028,961 B1 * | 4/2006 | Dittmer et al. | 248/278.1 |
| 7,243,892 B2 | 7/2007 | Pfister | |
| 7,267,314 B1 | 9/2007 | Erickson | |
| 7,448,584 B2 * | 11/2008 | Chen et al. | 248/278.1 |
| 7,510,155 B2 | 3/2009 | Huang et al. | |
| 2003/0223188 A1 | 12/2003 | Ha et al. | |
| 2005/0139742 A1 | 6/2005 | Frisell | |
| 2005/0152102 A1 * | 7/2005 | Shin | 361/681 |
| 2005/0236543 A1 * | 10/2005 | O'Neil | 248/286.1 |
| 2006/0016941 A1 * | 1/2006 | Choi et al. | 248/122.1 |
| 2006/0065795 A1 * | 3/2006 | Blackburn | 248/122.1 |
| 2006/0273231 A1 | 12/2006 | Huang | |
| 2006/0284031 A1 | 12/2006 | Whalen et al. | |
| 2007/0007413 A1 * | 1/2007 | Jung et al. | 248/284.1 |
| 2007/0034756 A1 | 2/2007 | Tsai et al. | |
| 2007/0120024 A1 | 5/2007 | Oddsen, Jr. et al. | |
| 2008/0023599 A1 | 1/2008 | Lin | |
| 2008/0192417 A1 * | 8/2008 | Hwang et al. | 361/681 |
| 2008/0258029 A1 * | 10/2008 | Zhang | 248/284.1 |
| 2008/0277539 A1 | 11/2008 | Lee et al. | |
| 2009/0078841 A1 * | 3/2009 | Oddsen, Jr. | 248/279.1 |
| 2009/0166502 A1 | 7/2009 | Wang et al. | |
| 2009/0173848 A1 * | 7/2009 | Green | 248/125.8 |
| 2010/0123061 A1 * | 5/2010 | Vlies | 248/220.1 |

* cited by examiner

*Primary Examiner* — Ramon Ramirez
(74) *Attorney, Agent, or Firm* — Barnes & Thornburg LLP

(57) ABSTRACT

A television lock for coupling a television to an anchor surface. The television lock includes a bracket for coupling to the rear panel of the television, a tether anchor for coupling to the anchor surface, and a bracket tether for coupling the bracket to the tether anchor.

32 Claims, 6 Drawing Sheets

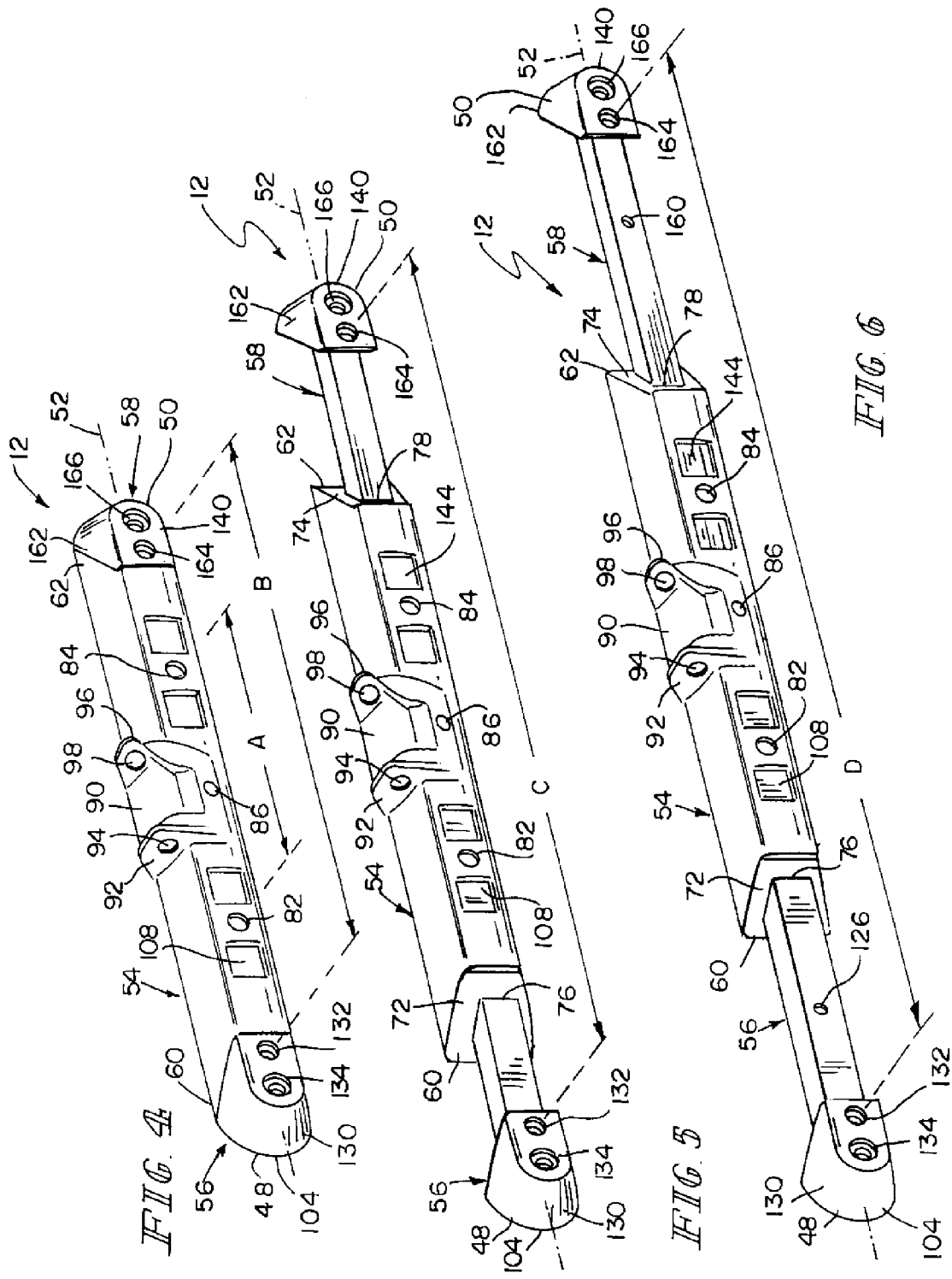

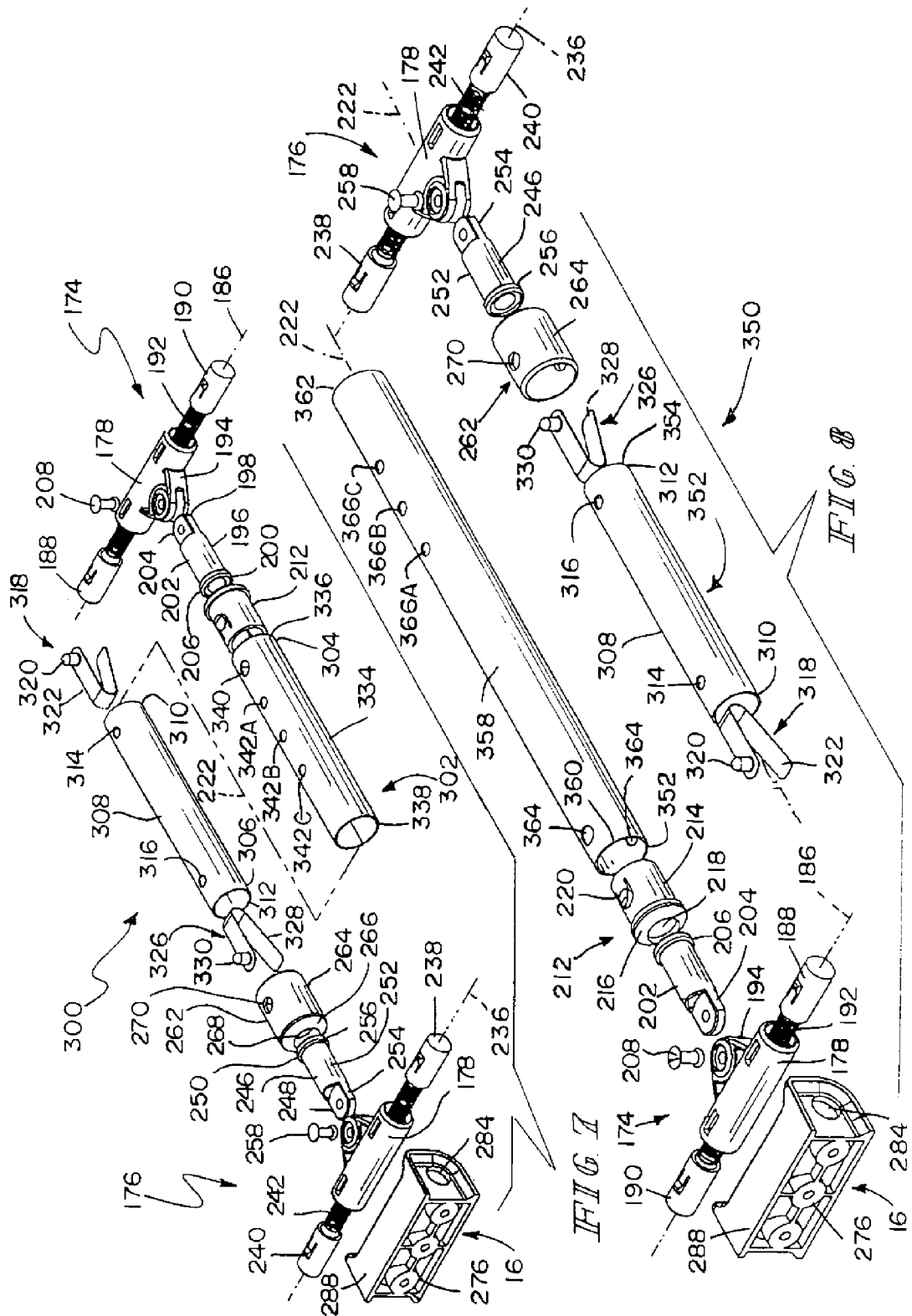

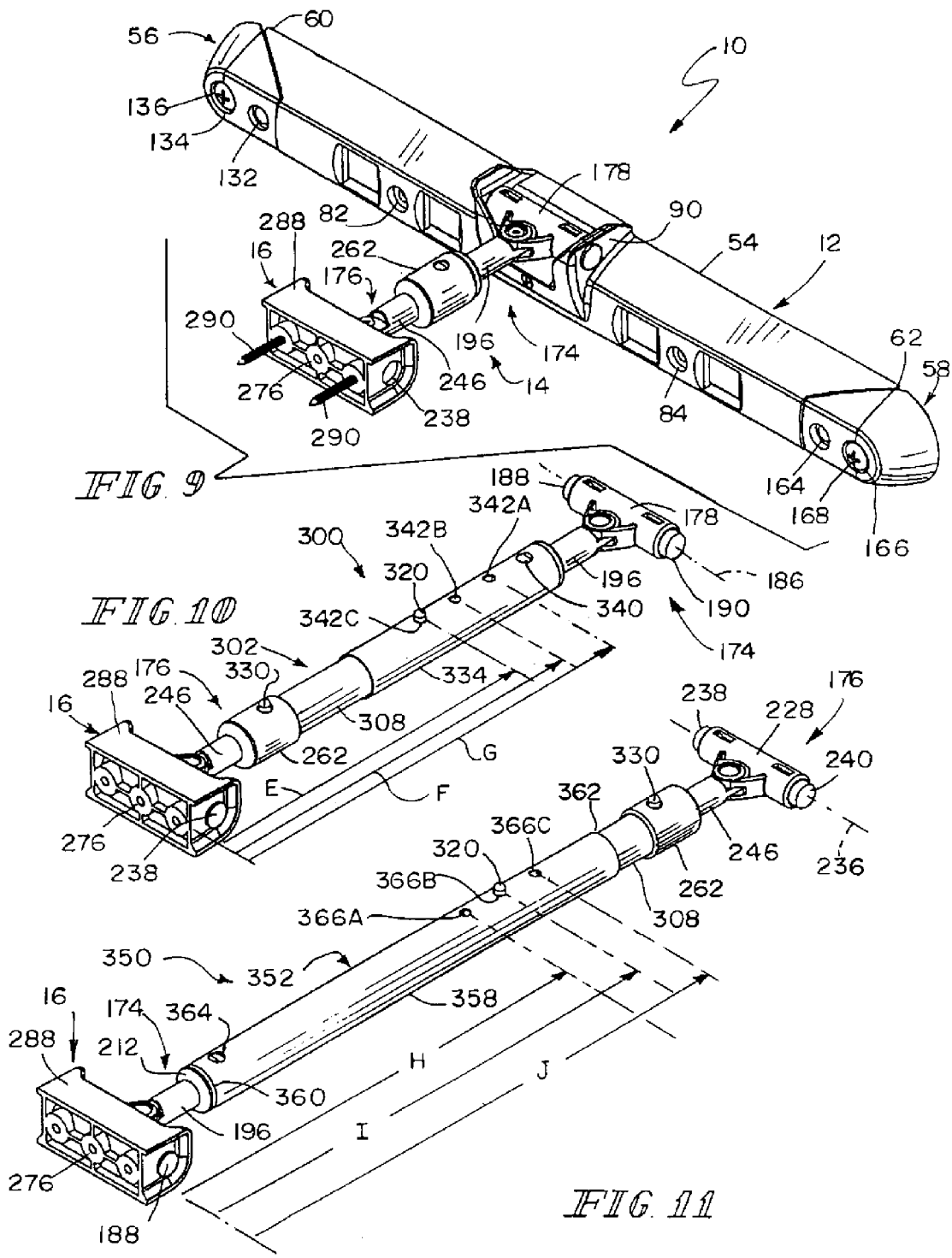

FLAT SCREEN TELEVISION LOCK

BACKGROUND

The present disclosure relates to television locks, and particularly to television locks for coupling a television to an anchor surface. More particularly, the present disclosure relates to a television lock that is adapted to be coupled to televisions of various sizes and that is adapted to couple a television to an anchor surface at various different distances from the anchor surface.

SUMMARY

According to the present disclosure, a television lock (TV lock) includes a bracket, a tether anchor and a bracket tether for coupling the bracket to the tether anchor. The bracket is adapted to be coupled to the rear panel of a television and the tether anchor is adapted to be coupled to an anchor surface such that the TV lock couples the television to the anchor surface.

In the illustrative embodiments, the bracket includes a mounting sleeve and a first arm and a second arm extending outwardly from the mounting sleeve. The first arm and second arm are selectively movable with respect to the mounting sleeve such that the bracket may be coupled to televisions of various sizes. The bracket tether is extensible to allow the television to be coupled to the anchor surface by the TV lock at various different distances from the anchor surface. The bracket tether is pivotably coupled to the bracket and to the tether anchor such that the tether anchor may be selectively positioned on the anchor surface in a desired position with respect to the bracket and television. The TV lock couples the television to the anchor surface to provide stability to the television and inhibit tipping of the television.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIGS. 4-6 is a sequence of views showing the first and second arms of the bracket moving between a fully retracted position and a fully extended position, FIG. 4 showing the first arm and the second arm of the bracket fully retracted with respect to the mounting sleeve, FIG. 5 showing the first and second arms of the bracket partially extended with respect to the mounting sleeve, and FIG. 6 showing the first and second arms fully extended with respect to the mounting sleeve;

FIG. 4 is a perspective view of the bracket showing the first arm and second arm fully retracted with respect to the mounting sleeve for situations where the bracket is to be mounted to a small-size TV;

FIG. 5 is a perspective view of the bracket showing the first arm and the second arm in a partially extended position with respect to the mounting sleeve for situations where the bracket is to be mounted to a medium-size TV;

FIG. 6 is a perspective view of the bracket showing the first and second arms in a fully extended position with respect to the mounting sleeve for situations where the bracket is to be mounted to a large-size TV;

FIG. 7 is an exploded view of another embodiment of the extensible bracket tether shown with the tether anchor, the extensible bracket tether has a telescoping coupler including a connector member and a first extension member, the length of the extensible bracket tether is selectively adjustable within a first range of lengths;

FIG. 8 is an exploded view of a further embodiment of the extensible bracket tether shown with the tether anchor, the extensible bracket tether has a telescoping coupler including a connector member and a second extension member that is longer than the first extension member of the embodiment shown in FIG. 7, the length of the extensible bracket tether of FIG. 8 is selectively adjustable within a second range of lengths that are longer than the first range of lengths provided by the extensible bracket tether of FIG. 7;

FIG. 9 is a perspective view of the TV lock showing the first arm and second arm of the bracket fully retracted with respect to the mounting sleeve and showing a short-length extensible bracket tether coupling the bracket to the tether anchor for situations where the TV is located closely to an anchor surface;

FIG. 10 is a perspective view of the medium-length extensible bracket tether of FIG. 7 coupled to the tether anchor, and showing that the length of the extensible bracket tether is selectively adjustable within a first range of lengths, for situations where the TV is located a medium distance to the anchor surface on which the tether anchor is to be mounted;

FIG. 11 is a perspective view of the long-length extensible bracket tether of FIG. 8 coupled to the tether anchor, and showing that the length of the extensible bracket tether is selectively adjustable within a second range of lengths that are longer than the first range of lengths provided by the medium-length extensible bracket tether of FIG. 10, for situations where the TV is located a long distance to the anchor surface on which the tether anchor is to be mounted;

DESCRIPTION

Figure 1:
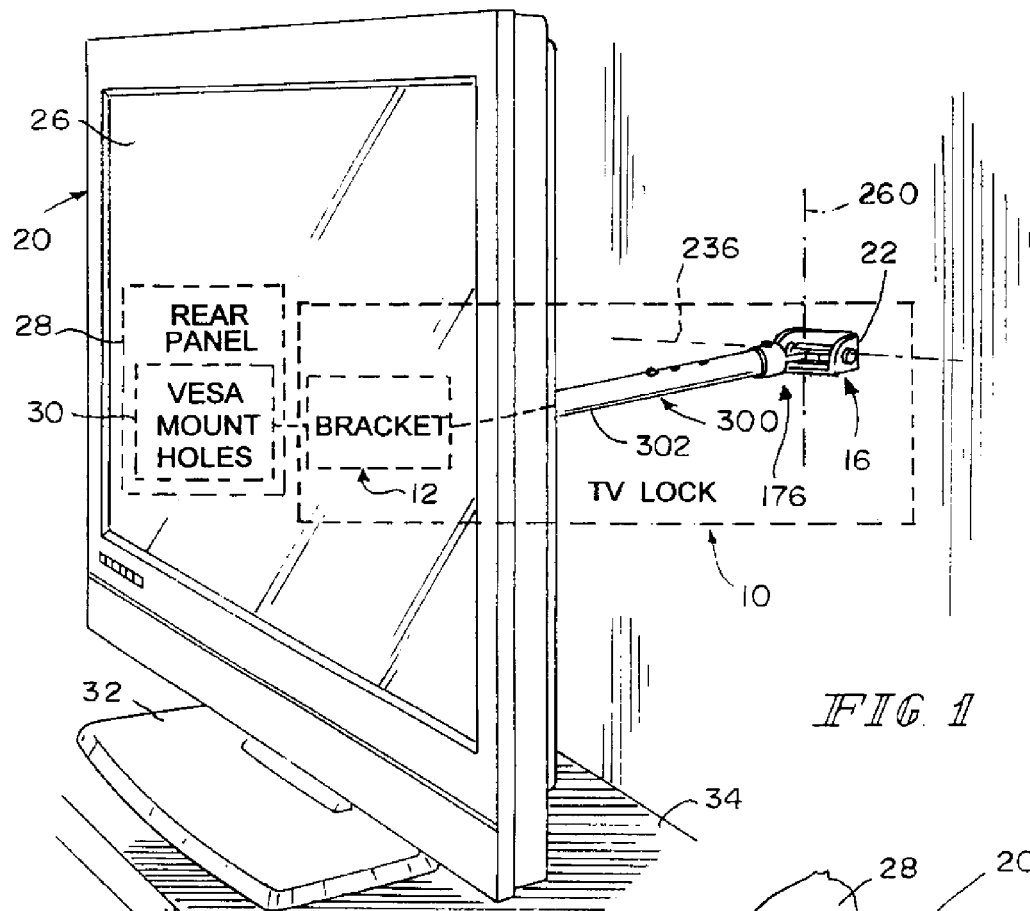
FIG. 1 is a perspective view of a television (TV) sitting on a support and showing a TV lock coupled at a first end to Video Electronics Standards Association (VESA) mount holes in the rear panel of the TV and at a second end to an anchor surface of a vertical wall, the TV lock providing stability to the TV and inhibiting potential tipping of the TV.
Figure 2:
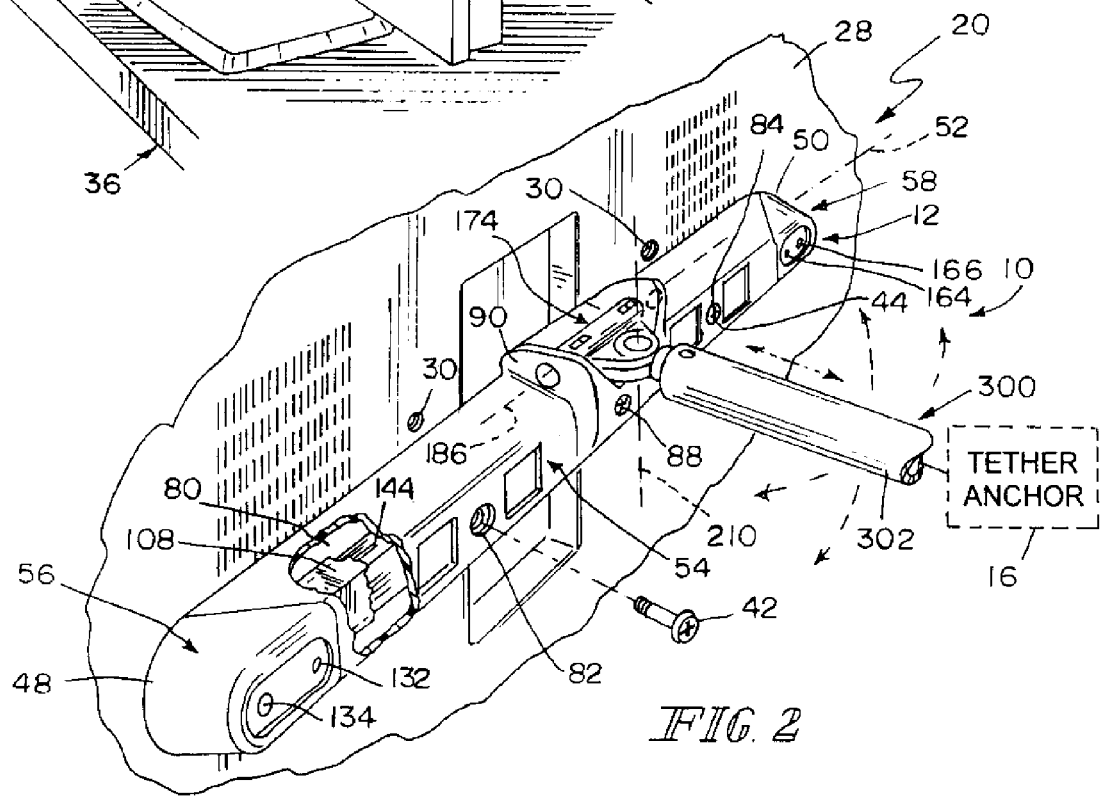
FIG. 2 is an enlarged perspective view of the rear panel of the TV showing a bracket of the TV lock coupled to the VESA mount holes in the rear panel of the TV and an extensible bracket tether coupling the bracket to a tether anchor, the extensible bracket tether being pivotably movable with respect to the bracket about multiple axes to permit the tether anchor to be selectively positioned with respect to the bracket for mounting on an anchor surface.

A television lock (TV lock) 10 is shown in FIG. 1 including a bracket 12 and an extensible bracket tether 14 for coupling bracket 12 to a tether anchor 16. TV lock 10 is shown coupling a television (TV) 20 to an anchor surface 22 of a stationary member 24, such as for example, a vertical wall. TV 20 includes a front viewing screen 26 and a rear panel 28 including a plurality of Video Electronics Standards Association (VESA) mount holes 30. TV 20 also includes a support base 32. TV 20 is shown sitting upon a top surface 34 of a support 36, such as for example, a TV stand, table, bookcase, shelf or the like.

TV 20 is shown as a flat screen type of television that has a relatively small depth between viewing screen 26 and rear panel 28 in comparison to the width and height of viewing screen 26. TV 20 may include a tuner for receiving over the air broadcast signals, satellite TV signals, or cable TV signals, or alternatively, TV 20 may not include a tuner such that TV 20 acts as a monitor as may be used for example in connection with a computer. TV 20 may include various different types of displays, such as, for example, a plasma display or a liquid crystal display (LCD). TV's that include a cathode ray tube (CRT) typically have a foot print wherein the width and depth of the base of the CRT TV are large such that it is difficult to tip over a CRT TV. Flat screen TV's such as TV 20 shown in FIG. 1 often include a support base 32 with a foot print having a short depth compared to the width and height of TV 20. Support base 32 of TV 20 has a depth between front and rear edges of support base 32 that is relatively shorter than the width of support base 32 and the width and height of viewing screen 26 such that TV 20 is susceptible to being tipped over inadvertently, such as by a child, which may cause potential injury to the child and damage to TV 20.

TV's are available in various different sizes such as with twelve inch to ninety inch or larger viewing screens 26. The distance at which VESA mount holes 30 are spaced apart from one another is dependent upon the size of TV 20. VESA mount holes 30 may be spaced apart from one another at 200 millimeters (mm), 400 mm, 600 mm or 800 mm spacings. VESA mount holes 30 at the 200 mm and 400 mm spacing may have a diameter of 4 mm. VESA mount holes 30 at the 600 mm and 800 mm spacing may have a diameter of 4 mm or 6 mm. Bracket 12 is adapted to be removably coupled to rear panel 28 of TV 20 by a first fastener 42 and a second fastener 44 that are adapted to threadably engage 4 mm diameter VESA mount holes 30 or by first and second fastener 136 and 168 that are adapted to threadably engage 6 mm diameter VESA mount holes 30.

Bracket 12 extends generally linearly between a first end 48 and a second end 50 and includes a generally linear central axis 52. Bracket 12 includes a mounting sleeve 54, a first arm 56 and a second arm 58. Mounting sleeve 54 extends generally linearly between a first end 60 and a second end 62. Mounting sleeve 54 includes a bottom wall 64, a top wall 66, a front wall 68 and a rear wall 70, each of which extends from first end 60 to second end 62. Front wall 68 and rear wall 70 may include a plurality of openings. Mounting sleeve 54 includes a first end wall 72 at first end 60 and a second end wall 74 at second end 62. A first aperture 76 is located in first end wall 72 and a second aperture 78 is located in second end wall 74. A hollow generally linear channel 80 extends from first aperture 76 to second aperture 78 along central axis 52.

Mounting sleeve 54 includes a first mounting hole 82 in rear wall 70 that is in communication with channel 80 and that is in alignment with an opening in front wall 68, and a second mounting hole 84 in rear wall 70 that is in communication with channel 80 and that is in alignment with an opening in front wall 68. First mounting hole 82 and second mounting hole 84 are spaced apart from one another at a selected distance, such as 200 mm, on opposite sides of the center of mounting sleeve 54. Mounting sleeve 54 also includes an aperture 86 extending through rear wall 70 and located midway between first end 60 and second end 62. A threaded fastener 88, such as a set screw, is located in aperture 86 and is threadably engaged to rear wall 70. Front wall 68 includes an aperture 87 at first end 60 at an aperture 89 at second end 62. Mounting sleeve 54 also includes a tether mount 90 attached to top wall 66 and rear wall 70 generally midway between first end 60 and second end 62. Tether mount 90 includes a first lug 92 having a first aperture 94 and a spaced apart second lug 96 having a second aperture 98. First aperture 94 and second aperture 98 of first and second lugs 92 and 96 are coaxially aligned with one another along a linear axis 100 that is spaced apart from and generally parallel to axis 52.

Figure 3:
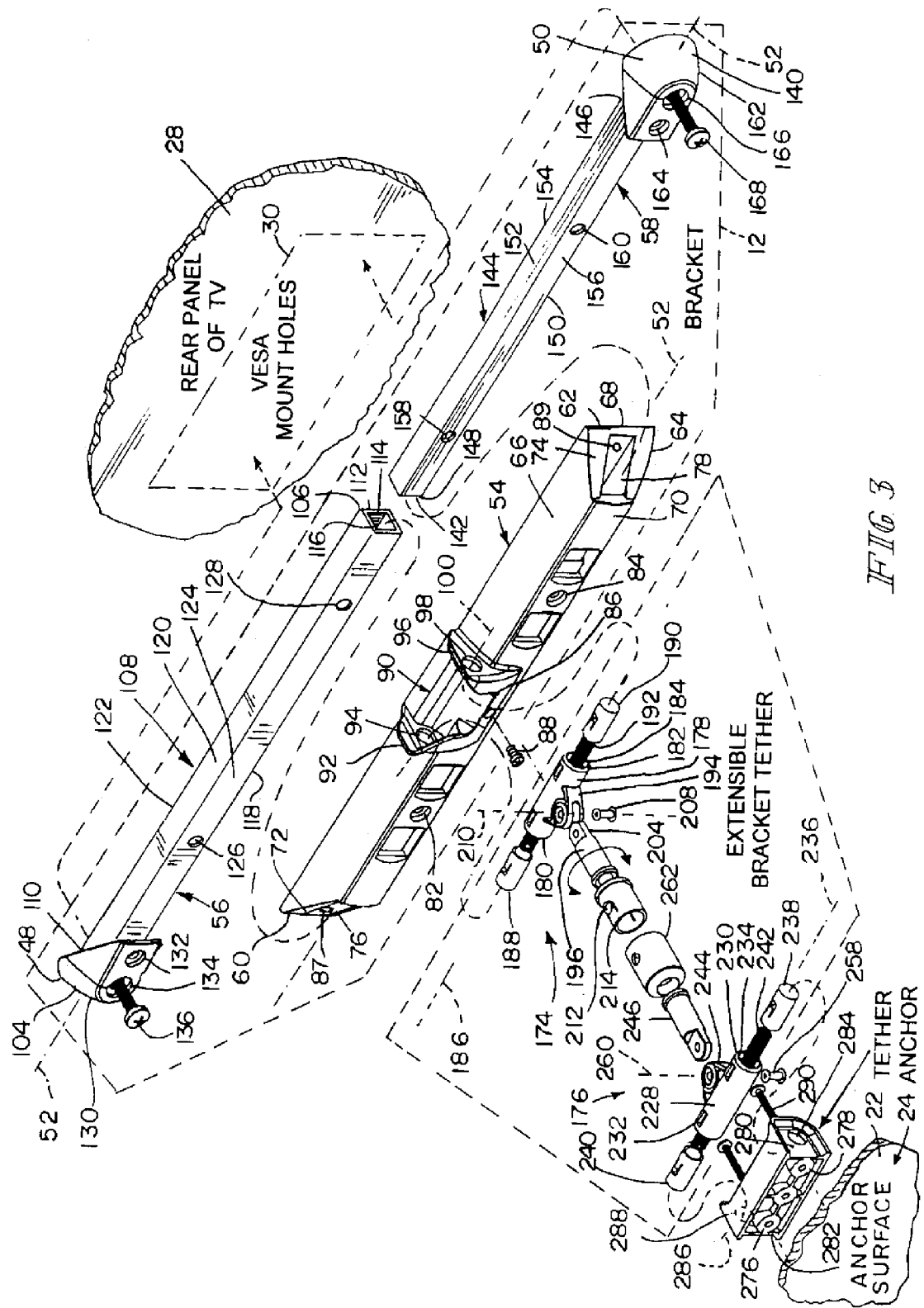
FIG. 3 is an exploded view of the TV lock showing the mounting sleeve of the bracket including a first aperture configured to receive a proximal end of a first arm and a second aperture configured to receive the proximal end of a second arm with the distal ends of the first and second arms configured to be coupled to the VESA mount holes of the rear panel of the TV by fasteners, the first end of the extensible bracket tether is configured to be pivotably coupled to the mounting sleeve of the bracket and the second end of the extensible bracket tether is configured to be pivotably coupled to the tether anchor, the tether anchor couples the extensible bracket tether to an anchor surface, the first and second arms of the bracket are selectively adjustable to fit TVs of various sizes as shown in FIGS. 4-6, other alternative embodiments of the extensible bracket tether are shown in FIGS. 10 and 11.

First arm 56 extends generally linearly along axis 52 between a distal first end 104 and a proximal second end 106. First arm 56 includes a generally linear tubular strut 108 extending between a first end 110 and a second end 112. Strut 108 includes an aperture 114 at second end 112 and a hollow bore 116 that extends from aperture 114 toward first end 110. Strut 108 is generally rectangular and tubular and has a bottom wall 118, a top wall 120, a front wall 122 and a rear wall 124 as shown in FIG. 3. A first passageway 126 extends through strut 108 from rear wall 124 to front wall 122 generally transverse to axis 52. A second passageway 128 extends through strut 108 from rear wall 124 to front wall 122 generally transverse to axis 52. First and second passageways 126 and 128 are spaced apart from one another a selected distance, such as 200 mm.

A first mount 130 is attached to first end 110 of strut 108 and is located at first end 104 of first arm 56. First mount 130 includes a first mounting hole 132 that extends through first mount 130 and strut 108 generally transverse to axis 52. First mounting hole 132 has a first diameter. First mount 130 includes a second mounting hole 134 that extends through first mount 130 and strut 108 generally transverse to axis 52. Second mounting hole 134 has a second diameter that is larger than the first diameter of first mounting hole 132. Second mounting hole 134 is parallel to and spaced apart from first mounting hole 132 and is located distally from first mounting hole 132. First mounting hole 132 is adapted to receive first fastener 42. Second mounting hole 134 is adapted to receive first fastener 136 having a diameter that is larger than the diameter of first fastener 42.

Strut 108 is configured such that second end 112 may be inserted through first aperture 76 of mounting sleeve 54 such that second end 106 is located within channel 80 and first end 104 of strut 108 and first mount 130 are located externally of mounting sleeve 54. Strut 108 is configured to fit closely within channel 80 while allowing strut 108 to be linearly and slidably movable within channel 80 with respect to mounting sleeve 54 along axis 52. First arm 56 is selectively linearly slidably movable with respect to mounting sleeve 54 along axis 52 between a retracted position wherein first mount 130 is located adjacent first end 60 of mounting sleeve 54 and an extended position wherein first mount 130 is spaced apart from first end 60 of mounting sleeve 54.

Second arm 58 extends generally linearly along axis 52 between a distal first end 140 and a proximal second end 142.

Second arm 58 includes a second strut 144 that extends along axis 52 between a first end 146 and a second end 148. Second strut 144 is generally rectangular and tubular and includes a bottom wall 150, a top wall 152, a front wall 154 and a rear wall 156. Second strut 144 includes a first passageway 158 that extends through rear wall 156 and front wall 154 generally transverse to axis 52 and a second passageway 160 that extends through rear wall 156 and front wall 154 generally transverse to axis 52. First passageway 158 and second passageway 160 are spaced apart from one another the same distance that first and second mounting holes 82 and 84 of mounting sleeve 54 are spaced apart from one another, and the same distance that first passageway 126 and second passageway 128 of first strut 108 are spaced apart from one another, such as 200 mm.

A second mount 162 is attached to first end 146 of second strut 144. Second mount 162 includes a first mounting hole 164 that extends through second mount 162 and second strut 144 generally transverse to axis 52, and a second mounting hole 166 that extends through second mount 162 and second strut 144 generally transverse to axis 52. First mounting hole 164 has a first diameter and second mounting hole 166 has a second diameter that is larger than the first diameter of first mounting hole 164. Second mounting hole 166 is located adjacent first mounting hole 164 and is located distally with respect to first mounting hole 164. First mounting hole 164 is adapted to receive second fastener 44. Second mounting hole 166 is adapted to receive second fastener 168 having a diameter that is larger than the diameter of second fastener 44.

Second strut 144 is configured such that second end 148 may be inserted into bore 116 of first strut 108 through aperture 114 and such that second strut 144 fits closely within first strut 108 and within channel 80 of mounting sleeve 54. Second arm 58 extends outwardly from second aperture 78 of mounting sleeve 54 and is linearly and slidably movable along axis 52 with respect to mounting sleeve 54 between a retracted position wherein second mount 162 is located adjacent second end 62 of mounting sleeve 54 and an extended position wherein second mount 162 is spaced apart from second end 62 of mounting sleeve 54. First arm 56 and second arm 58 are independently slidably movable along axis 52 with respect to one another and with respect to mounting sleeve 54. Fastener 88 is configured to releasably engage first strut 108 of first arm 56 to retain first arm 56 in a selected position with respect to mounting sleeve 54. When first arm 56 and second arm 58 are both in their retracted positions, first mounting hole 82 of mounting sleeve 54, first passageway 126 of first arm 56 and first passageway 158 of second arm 58 are aligned with one another to receive first fastener 42, and second mounting hole 84 of mounting sleeve 54, second passageway 128 of first arm 56 and second passageway 160 of second arm 58 are aligned with one another to receive second fastener 44. In addition, when first arm 56 and second arm 58 are both in their retracted positions, first mounting hole 132 of first arm 56 is aligned with aperture 87 in mounting sleeve 54, and first mounting hole 164 of second arm 58 is aligned with aperture 89 of mounting sleeve 54.

Extensible bracket tether 14 includes a generally T-shaped first connector 174 and a generally T-shaped second connector 176. First connector 174 includes a generally cylindrical housing 178 extending between a first end 180 and a second end 182. Housing 178 includes a central cylindrical bore 184 having a generally linear central axis 186. A first button 188 is located within bore 184 and extends outwardly from first end 180 of housing 178. A second button 190 is located within bore 184 and extends outwardly from second end 182 of housing 178. First and second buttons 188 and 190 include a plurality of resilient detent members configured to be located within elongate longitudinal slots in housing 178 to allow linear slidable movement of first and second buttons 188 and 190 with respect to housing 178.

A resilient biasing member 192, such as a helical coil spring, is located within bore 184 and extends between first button 188 and second button 190. Biasing member 192 resiliently biases first button 188 to an extended position wherein the distal end of first button 188 is located outwardly from first end 180 of housing 178, and resiliently biases second button 190 to an extended position wherein the distal end of second button 190 is located outwardly from second end 182 of housing 178. First and second buttons 188 and 190 are selectively linearly movable along axis 186 from the extended position to a retracted position wherein the distal end of first button 188 is located approximately coplanar with or inwardly from first end 180 of housing 178 and distal end of second button 190 is located approximately coplanar with or inwardly from second end 182 of housing 178. A link mount 194 having a pair of spaced apart ears is attached to housing 178.

First connector 174 also includes a first link 196 having a first end 198 and a second end 200. First link 196 includes a generally cylindrical body 202, a tab 204 attached to a first end of body 202 and an annular abutment 206 that extends outwardly from a second end of body 202. Tab 204 is configured to be located in a slot between the ears of link mount 194 such that first link 196 is pivotably coupled to housing 178 by a fastener 208 that extends through an aperture in tab 204 and apertures in the ears of link mount 194 for pivotable movement about an axis 210 that is generally transverse to axis 186. First connector 174 also includes a male end cap 212. Male end cap 212 includes a generally cylindrical collar 214 extending outwardly from an end wall 216. End wall 216 includes a circular aperture 218. Collar 214 includes a plurality of resiliently retractable detents 220. Body 202 of first link 196 extends through aperture 218 with abutment 206 located within collar 214. Male end cap 212 is linearly and slidably movable with respect to body 202 of first link 196 along an axis 222 between an extended position wherein end wall 216 engages abutment 206 and a retracted position wherein end wall 216 is located at the first end of body 202 and engages link mount 194. Male end cap 212 is slidable with respect to first link 196 a selected distance, such as approximately one inch. Male end cap 212 is infinitely positionable with respect to first link 196 between the retracted and extended positions. Male end cap 212 is rotatable with respect to first link 196 about axis 222 in either rotational direction.

First connector 174 is configured to be coupled to tether mount 90 of mounting sleeve 54 by retracting first and second buttons 188 and 190 within housing 178, placing housing 178 between first and second lugs 92 and 96 of tether mount 90 in alignment with first and second apertures 94 and 98, and then releasing first and second buttons 188 and 190 as suggested in FIG. 3. First button 188 extends through aperture 94 and second button 190 extends through aperture 98 when first and second buttons 188 and 190 are in their extended positions. First and second buttons 188 and 190 pivotably couple first connector 174 to tether mount 90 and mounting sleeve 54 for pivotable movement about axis 186 which is coaxially aligned with axis 100.

Second connector 176 includes a generally cylindrical housing 228 extending between a first end 230 and a second end 232. A generally cylindrical bore 234 extends within housing 228 between first end 230 and second end 232 along a generally linear axis 236. A first button 238 is located within bore 234 and extends outwardly from first end 230 of housing 228. A second button 240 is located within bore 234 and extends outwardly from second end 232 of housing 228. First button 238 and second button 240 each include a plurality of resilient detent members configured to be located within elongate longitudinal slots in housing 228 to allow linear slidable movement of first and second buttons 238 and 240 with respect to housing 228 between retracted and extended positions.

A resilient biasing member 242, such as a helical coil spring, is located within bore 234 and extends between first button 238 and second button 240. Biasing member 242 resiliently biases first button 238 to an extended position wherein the distal end of first button 238 is located outwardly from first end 230 of housing 228, and resiliently biases second button 240 to an extended position wherein the distal end of second button 240 is located outwardly from second end 232 of housing 228. First button 238 may be moved to a retracted position wherein the distal end of first button 238 is located approximately coplanar with or inwardly from first end 230 of housing 228. Second button 240 may be moved to a retracted position wherein the distal end of second button 240 is located approximately coplanar with or inwardly from second end 232 of housing 228. First and second buttons 238 and 240 are selectively slidable between the retracted and extended positions along axis 236. A link mount 244 having spaced apart ears is attached to housing 228.

Second connector 176 also includes a second link 296 having a first end 248 and a second end 250. Second link 246 includes a generally cylindrical body 252, a tab 254 attached to a first end of body 252 and an annular abutment 256 extending outwardly from a second end of body 252. Tab 254 is configured to be inserted in a slot between the ears of link mount 244 and to be pivotally connected thereto by a fastener 258 that extends through an aperture in tab 254 and apertures in the ears of link mount 244. Second link 246 is thereby pivotally coupled to housing 228 for pivotable movement about an axis 260 that is generally transverse to axis 236. Second connector 176 also includes a female end cap 262 having a generally tubular and cylindrical collar 264 extending outwardly from an end wall 266. End wall 266 includes a generally circular aperture 268. Collar 264 includes a plurality of diametrically opposed apertures 270. Second link 246 extends through aperture 268 in end wall 266 of female end cap 262 such that abutment 256 is adapted to engage end wall 266.

Female end cap 262 is selectively rotatable with respect to body 252 of second link 246 about axis 222 in either direction. Female end cap 262 is not substantially slidable longitudinally along axis 222 with respect to second link 246. However, body 252 of second link 246 could be lengthened to allow female end cap 262 to be longitudinally slidable along axis 222 with respect to second link 246 if desired. Collar 214 of male end cap 212 is configured to be inserted within the cavity of collar 264 of female end cap 262 such that detents 220 of male end cap 212 extend into apertures 270 of collar 264 of female end cap 262 whereby male end cap 212 is coupled to female end cap 262. The coupled male end cap 212 and female end cap 262 are selectively conjointly rotatable with respect to first link 196 and second link 246.

Tether anchor 16 includes a rear wall 276 having one or more apertures 278. A first lug 280 and a second lug 282 extend generally transversely from opposite ends of rear wall 276. First lug 280 includes a first aperture 284 and second lug 282 includes a second aperture 286. First and second lugs 280 and 282 are spaced apart from one another and first and second apertures 284 and 286 are coaxially aligned with one another. A shelf 288 extends between first lug 280 and second lug 282 and generally transversely outwardly from rear wall 276. Tether anchor 16 is adapted to be coupled to anchor surface 22 of stationary member 24 by fasteners 290 that extend through apertures 278. First button 238 of second connector 176 is configured to extend within first aperture 284 of first lug 280 and second button 240 of second connector 176 is configured to extend into second aperture 286 of second lug 282 such that second connector 176 is releasably and pivotally coupled to tether anchor 216 for pivotable movement about axis 236. Alternatively, first connector 174 may be pivotally coupled to tether anchor 16 and second connector 176 may be pivotally coupled to tether mount 90 of mounting sleeve 54.

Tether anchor 16 may be coupled to anchor surface 22 with shelf 288 at the bottom of tether anchor 16 as shown in FIG. 1, or tether anchor 16 may be coupled to anchor surface 22 with shelf 288 located at the top of tether anchor 16 as shown in FIG. 3. In addition, tether anchor 16 may be coupled to anchor surface 22 in any rotational position as desired. Tether anchor 16 may desirably be located in a vertical position, as opposed to a generally horizontal position as shown in FIGS. 1 and 3, when tether anchor 16 is to be coupled to anchor surface 22 and also to a vertical stud located behind anchor surface 22.

Extensible bracket tether 14 couples bracket 12 to tether anchor 16 and thereby couples TV 20 to anchor surface 22 of stationary member 24 to provide stability to TV 20 and inhibit tipping of TV 20. Tether anchor 16 may be coupled to anchor surface 22 in a selected one of multiple potential positions, and tether anchor 16 is selectively positionable with respect to bracket 12 in a selected one of multiple positions, because first connector 174 is pivotable with respect to bracket 12 about axis 186, second connector 176 is pivotable with respect to tether anchor 16 about axis 236, first link 196 of first connector 174 is pivotable with respect to housing 178 about axis 210, second link 246 of second connector 176 is pivotable with respect to housing 228 about axis 260, and the length of extensible bracket tether 14 between housing 178 and housing 228 is adjustable due to the slidability of male end cap 212 with respect to first link 196 along axis 222.

First arm 56 and second arm 58 are in the retracted position with respect to mounting sleeve 54 as shown in FIG. 4. First mounting hole 82 and second mounting hole 84 are spaced apart from one another a distance A, such as for example 200 mm. First mounting hole 132 at first end 104 of first arm 56 is located a distance B, such as for example 400 mm, from first mounting hole 164 at first end 140 of second arm 58. When first and second arms 56 and 58 are in the retracted position as shown in FIG. 4, first fastener 42 may be inserted through first mounting hole 82 and second fastener 44 may be inserted through second mounting hole 84 to removably couple bracket 12 to VESA mount holes 30 of a small-size TV 20. Alternatively, when first and second arms 56 and 58 are in the retracted position as shown in FIG. 4, first fastener 42 may be inserted through first mounting hole 132 of first arm 56 and aperture 87 of mounting sleeve 54, and second fastener 44 may be inserted through first mounting hole 164 of second arm 58 and aperture 89 of mounting sleeve 54 to removably couple bracket 12 to VESA mount holes 30 of a medium-size TV 20.

First arm 56 may be partially extended outwardly with respect to mounting sleeve 54 along axis 52 and second arm 58 may be extended partially outwardly with respect to mounting sleeve 54 along axis 52 such that first mounting hole 132 of first arm 56 is located a distance C, such as 600 mm, from first mounting hole 164 of second arm 58 as suggested in FIG. 5. First fastener 42 may be inserted through first mounting hole 132 of first arm 56 and second fastener 44 may be inserted through first mounting hole 164 of second arm 58 to removably couple bracket 12 to small-diameter VESA mount holes 30 of a large-size TV 20. Alternatively, second mounting hole 134 of first arm 56 may be located the distance C from second mounting hole 166 of second arm 58. First fastener 136 is inserted through second mounting hole 134 of arm 56 and second fastener 168 is inserted through second mounting hole 166 of second arm 58 to removably couple bracket 12 to large-diameter VESA mount holes 30 of a large-size TV 20.

First arm 56 and second arm 58 may be further extended along axis 52 with respect to mounting sleeve 54 from the extended position as shown in FIG. 5, such that first mounting hole 132 of first arm 56 is located a distance D from first mounting hole 164 of second arm 58, such as 800 mm, as suggested in FIG. 6. When first mounting hole 132 and first mounting hole 164 are spaced apart distance D, first fastener 42 may be inserted through first mounting hole 132 and second fastener 44 may be inserted through first mounting hole 164 to removably couple bracket 12 to small-diameter VESA mount holes 30 in rear panel 28 of an extra-large size TV 20. Alternatively, second mounting hole 134 of first arm 56 may be located distance D from second mounting hole 166 of second arm 58 such that first fastener 136 may be inserted through second mounting hole 134 and second fastener 168 may be inserted through second mounting hole 166 to removably couple bracket 12 to large-diameter VESA mount holes 30 in rear panel 28 of an extra-large size TV 20.

A second embodiment of the extensible bracket tether is shown in FIG. 7 in connection with tether anchor 16 and is designated with reference number 300. Bracket tether 300 includes first connector 174 and second connector 176 as included with bracket tether 14. Bracket tether 300 additionally includes a first telescoping coupler 302. First telescoping coupler 302 extends along axis 222 between a first end 304 and a second end 306. First telescoping coupler 302 includes a generally cylindrical and tubular connector member 308 having a first end 310 and a second end 312. Connector member 308 includes a locking pin aperture 314 at first end 310 and an end cap aperture 316 at second end 312.

A first locking member 318 is located within the bore of connector member 308 at first end 310. First locking member 318 includes a locking pin 320 and a resilient generally V-shaped biasing member 322 having a first leg and a second leg, with locking pin 320 attached to a distal end of the first leg. Locking pin 320 extends through locking pin aperture 314. Biasing member 322 resiliently biases locking pin 320 to an extended position wherein the distal end of locking pin 320 extends outwardly beyond connector member 308, while allowing locking pin 320 to be resistantly retracted such that the distal end of locking pin 320 is substantially flush with or located inwardly from the outer surface of connector member 308.

A second locking member 326 is located in the bore of connector member 308 at second end 312. Second locking member 326 includes a generally V-shaped resilient biasing member 328 having a first leg and a second leg and a locking pin 330 attached to a distal end of the first leg. Locking pin 330 extends through end cap aperture 316 and is resiliently movable between an extended position and a retracted position. Biasing member 328 resiliently biases locking pin 330 toward the extended position. The distal end of locking pin 330 extends outwardly from the outer surface of connector member 308 when locking pin 330 is in the extended position, and the distal end of locking pin 330 is located substantially flush with or inwardly from the outer surface of connector member 308 when locking pin 330 is in the retracted position.

First telescoping coupler 302 also includes a first extension member 334. First extension member 334 is generally cylindrical and tubular and extends between a first end 336 and a second end 338. First extension member 334 includes a pair of diametrically opposed end cap apertures 340 at first end 336. First extension member 334 also includes a plurality of locking pin apertures 342A, 342B and 342C. Locking pin apertures 342A-C are spaced apart from one another and are located in alignment with one another generally parallel to axis 222. Locking pin apertures 342A-C are uniformly spaced apart from one another an equal distance, such as the distance male end cap 212 is slidable with respect to first link 196, for example one inch. Locking pin aperture 342A is located most closely adjacent to and at a selected distance from end cap aperture 340 and first end 336 of first extension member 334. Locking pin aperture 342C is located most closely adjacent to and is spaced apart at a selected distance from second end 338 of first extension member 334. Locking pin 330 and end cap aperture 340 have a larger diameter than locking pin 320 and locking pin apertures 342A-C.

Second end 312 of connector member 308 is inserted into the cavity of female end cap 262 such that locking pin 330 extends through end cap aperture 316 of connector member 308 and aperture 270 in collar 264 of female end cap 262. Locking pin 330 thereby releasably couples second end 312 of connector member 308 to female end cap 262. Connector member 308 may be selectively removed from female end cap 262 by retracting locking pin 330 to the retracted position such that connector member 308 may be slidably removed from female end cap 262. Male end cap 212 is removably coupled to first end 336 of first extension member 334 by inserting collar 214 into the bore of first extension member 334 at first end 336 such that detents 220 of male end cap 212 extend into end cap apertures 340 of first extension member 334. First extension member 334 may be removed from male end cap 212 by retracting detents 220 from end cap apertures 340 and slidably removing male end cap 212 from first extension member 334.

First end 310 of connector member 308 is inserted into the bore of first extension member 334 at second end 338. Locking pin 320 of connector member 308 may be inserted into a selected one of the locking pin apertures 342A-C. The length of first telescoping coupler 302 between first end 304 and second end 306, and thereby also the length of bracket tether 300, may be selectively adjusted in incremental distances equal to the spacing between locking pin apertures 342A-C within a first range of lengths. While first extension member 334 is shown as including three locking pin apertures 342A-C, first extension member 334 may include fewer or additional locking pin apertures as may be desired. As an example, if the locking pin apertures 342A-C are spaced apart from one another at a uniform spacing of one inch, the length of first telescoping coupler 302 may be selectively adjusted to one of three different lengths in one inch increments. The length of bracket tether 300 is infinitely adjustable by the distance male end cap 212 is longitudinally slidable along first link 196, such that any distance within the first range of lengths may be provided.

A third embodiment of the extensible bracket tether is shown in FIG. 8 in connection with tether anchor 16 and is designated with reference number 350. Bracket tether 350 includes first connector 174 and second connector 176 as included in bracket tether 14 and bracket tether 300. It should be noted that in FIG. 8 bracket tether 350 has been rotated end-for-end with respect to tether anchor 16 from that shown in FIG. 3 and FIG. 7. Bracket tether 350 includes a second telescoping coupler 352 extending generally linearly along axis 222 between a first end 354 and a second end 356. Second telescoping coupler 352 includes connector member 308 as also included in first telescoping coupler 302. Second telescoping coupler 352 also includes a generally cylindrical and tubular second extension member 358 that extends along axis 222 between a first end 360 and a second end 362. Second extension member 358 includes a pair of diametrically opposed end cap apertures 364 located adjacent first end 360.

Second extension member 358 also includes a plurality of locking pin apertures 366A-C. Locking pin apertures 366A-C are located in alignment with one another generally parallel to axis 222 and are generally uniformly spaced apart from one another, such as at a spacing of one inch. Locking pin aperture 366C is located most closely adjacent to first end 360 of second extension member 358 and is located a distance from first end 360 that is approximately equal to the distance locking pin aperture 342C is located from second end 338 of first extension member 334 as shown in FIG. 7. Locking pin aperture 366A is located most closely to end cap apertures 364 and first end 360 of second extension member 358. Locking pin aperture 366A is located a distance from end cap apertures 364 and first end 360 of second extension member 358 that is greater than the distance at which locking pin aperture 342A is located from end cap apertures 340 and first end 336 of first extension member 334 as shown in FIG. 7, such that second extension member 358 is longer than first extension member 334.

Male end cap 212 of first connector 174 is removably coupled to first end 360 of second extension member 358 by inserting collar 214 into a bore of second extension member 358 at first end 360 such that detents 220 extend into end cap apertures 364 of second extension member 358. Second end 312 of connector member 308 is inserted into the cavity of female end cap 262 and is removably coupled to female end cap 262 by locking pin 330 which extends through end cap aperture 316 and aperture 270 in female end cap 262. First end 310 of connector member 308 is selectively coupled to second end 362 of second extension member 358 by inserting first end 310 into the bore of second extension member 358 at second end 362 such that locking pin 320 extends through locking pin aperture 314 of connector member 308 and a selected one of locking pin apertures 366A-C of second extension member 358. Second extension member 358 is shown as including three locking pin apertures 366A-C, but may include fewer or additional locking pin apertures as may be desired. The length of second telescoping coupler 352 between first end 354 and second end 356 is selectively incrementally adjustable by selective placement of locking pin 320 within a selected one of locking pin apertures 366A-C. The length of bracket tether 350 is also selectively adjustable in incremental lengths by selective insertion of locking pin 320 into a desired one of locking pin apertures 366A-C, and is infinitely adjustable by the distance male end cap 212 is longitudinally slidable along first link 196.

Bracket 12 is shown in FIG. 9 with first arm 56 and second arm 58 in the retracted positions with respect to mounting sleeve 54. First connector 174 of extensible bracket tether 14 is pivotably coupled to tether mount 90 of mounting sleeve 54 and second connector 176 is pivotably coupled to tether anchor 16. Male end cap 212 of first connector 174 is directly coupled to female end cap 262 of second connector 176 to form short-length extensible bracket tether 14. TV lock 10 as shown in FIG. 9 is adapted to couple TV 20 to anchor surface 22 in situations where TV 20 is located closely to anchor surface 22.

Medium-length bracket tether 300 of FIG. 7 is shown in FIG. 10 in an assembled condition with second connector 176 pivotably coupled to tether anchor 16. First telescoping coupler 302 couples first connector 174 to second connector 176. Locking pin 320 may be selectively positioned in a selected one of locking pin apertures 342A-C to selectively incrementally vary the length bracket tether 300 within a first range of lengths for situations where TV 20 is located a medium distance to anchor surface 22. When locking pin 320 is inserted within locking pin aperture 342C as shown in FIG. 10, locking pin aperture 342C is located a distance E from the outer surface of rear wall 276 of tether anchor 16, locking pin aperture 342B is located a distance F from the outer surface of rear wall 276 of tether anchor 16, and locking pin aperture 342A is located a distance G from the outer surface of rear wall 276 of tether anchor 16.

Long-length extensible bracket tether 350 of FIG. 8 is shown in FIG. 11 in an assembled condition and pivotably coupled to tether anchor 16. Second telescoping coupler 352 couples first connector 174 to second connector 176. Locking pin 320 of connector member 308 is configured to be inserted in a selected one of locking pin apertures 366A-C of second extenture 358 to selectively incrementally vary the length of bracket tether 350 within a second range of lengths, which are longer than the first range of lengths provided by first telescoping coupler 302 of bracket tether 300. Bracket tether 350 is intended for use in situations where TV 20 is located a long distance to anchor surface 22. When locking pin 320 is inserted within locking pin aperture 366B as shown in FIG. 11, locking pin aperture 366A is located a distance H from the outer surface of rear wall 276 of tether anchor 16, locking pin aperture 366B is located a distance I from the outer surface of rear wall 276 of tether anchor 16, and locking pin aperture 366C is located a distance J from the outer surface of rear wall 276 of tether anchor 16.

Figure 12:
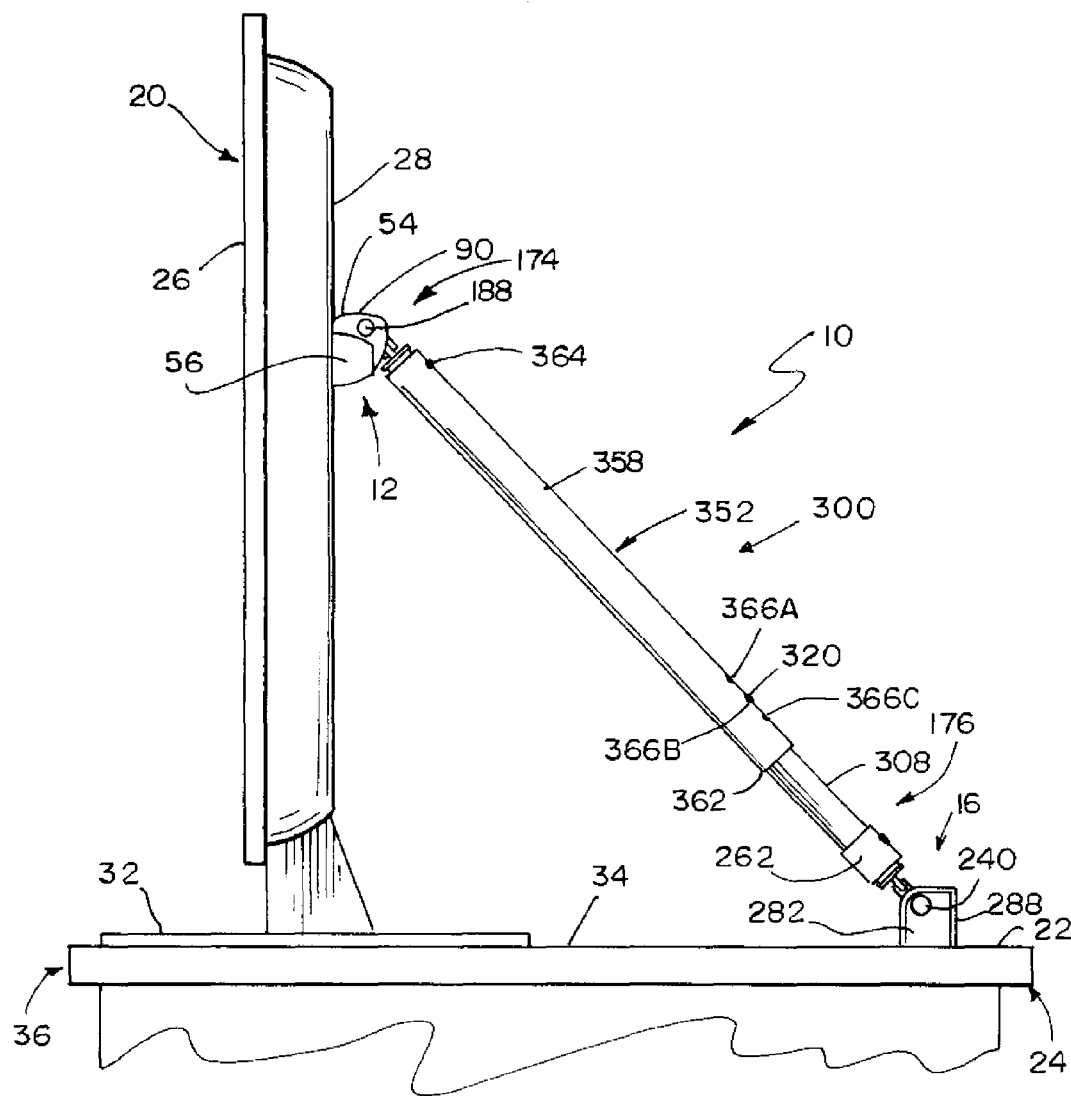
FIG. 12 is a perspective view of a TV sitting on a support with the bracket of the TV lock coupled to the rear panel of the TV and with the extensible bracket tether coupling the bracket to a tether anchor coupled to a horizontal anchor surface for situations where the TV may be located too far from a vertical anchor surface to be reached by the long-length extensible bracket tether of FIG. 11.

In situations where TV 20 is located too far from a vertical stationary member 24, such as a wall, to be coupled to the vertical stationary member 24 by the TV lock 10, tether anchor 16 may be coupled to a horizontal anchor surface 22 of a stationary member 24 as suggested in FIG. 12. Stationary member 24 may comprise support 36 which supports TV 20 or stationary member 24 may be a separate stationary member from support 36.

TV lock 10 may comprise a kit including bracket 12, first connector 174, second connector 176, tether anchor 16, first telescoping coupler 302 including connector member 308 and first extension member 334, and second extension member 358. When TV 20 is a short distance from anchor surface 22, short-length bracket tether 14 may be formed for coupling bracket 12 to tether anchor 16 by directly coupling first connector 174 to second connector 176, without using connector member 308, first extension member 334 or second extension member 358. When TV 20 is a medium distance from anchor surface 22, medium-length bracket tether 300 may be formed for coupling bracket 12 to tether anchor 16 by coupling first connector 174 to second connector 176 with connector member 308 and first extension member 334 of first telescoping coupler 302, without using second extension member 358. When TV 20 is a long distance from anchor surface 22, long-length bracket tether 350 may be formed for coupling bracket 12 to tether anchor 16 by coupling first connector 174 to second connector 176 with connector member 308 and second extension member 358, second extension member 358 being used in connection with connector member 308 in place of first extension member 334 and first extension member 334 not being used.

The invention claimed is:

1. A television lock for a television having a rear panel, the television lock comprising
an anchor adapted to be coupled to an anchor surface,
a tether having a first end and a second end, the second end of the tether configured to be coupled to the anchor,
mounting means for coupling the first end of the tether to the rear panel of the television such that the television is coupled to the anchor surface,
wherein the mounting means comprises a bracket including a plurality of mounting holes and each mounting hole is adapted to receive a fastener, and
wherein the bracket includes a mounting sleeve having a first aperture at a first end and a second aperture at a second end, a first arm having a first end including one or more of the mounting holes and a second end extending outwardly from the first aperture of the mounting sleeve, and a second arm having a first end including one or more of the mounting holes and a second end extending outwardly from the second aperture of the mounting sleeve, the first arm is selectively positionable with respect to the first end of the mounting sleeve, and the second arm is selectively positionable with respect to the second end of the mounting sleeve such that the bracket is adapted to be coupled to televisions of different sizes.

2. The television lock of claim 1, wherein the first arm comprises a first strut having a first end and a second end, the first strut extending through the first aperture of the mounting sleeve with the first end of the first strut located outside the mounting sleeve, and a first mount attached to the first end of the first strut, the first mount including a first mounting hole having a first diameter and a second mounting hole having a second diameter, the second diameter being larger than the first diameter, and the second arm comprises a second strut having a first end and a second end, the second strut extending through the second aperture of the mounting sleeve with the first end of the second strut located outside the mounting sleeve, and a second mount attached to the first end of the second strut, the second mount including a third mounting hole having a third diameter and a fourth mounting hole having a fourth diameter, the fourth diameter being larger than the third diameter.

3. The television lock of claim 1, wherein the mounting sleeve includes a channel extending generally linearly between the first aperture and the second aperture of the mounting sleeve, the first arm comprising an elongate generally tubular first strut located within the channel of the mounting sleeve and projecting outwardly from the first aperture of the mounting sleeve, the second arm comprising an elongate second strut located within the channel of the mounting sleeve and projecting outwardly from the second aperture of the mounting sleeve, the second end of the second strut being located within the second end of the tubular first strut, the first and second struts being selectively slidable within the channel of the mounting sleeve such that the one or more mounting holes of the first arm member can be selectively positioned with respect to the one or more mounting holes of the second arm member.

4. The television lock of claim 1, wherein the mounting sleeve includes a channel extending between the first aperture and the second aperture of the mounting sleeve, a first mounting hole, and a second mounting hole, the first arm being selectively slidable within the channel between a retracted position and an extended position and the second arm being selectively slidable within the channel between a retracted position and an extended position, the first arm including a first passageway and a second passageway, the second arm including a first passageway and a second passageway, the first passageway of the first arm being aligned with the first mounting hole of the mounting sleeve and the second passageway of the first arm being aligned with the second mounting hole of the mounting sleeve when the first arm is in the retracted position, the first passageway of the second arm being aligned with the first mounting hole of the mounting sleeve and the second passageway of the second arm being aligned with the second mounting hole of the mounting sleeve when the second arm is in the retracted position.

5. The television lock of claim 1, wherein the bracket includes a mounting sleeve having a tether mount and the first end of the tether is configured to be coupled to the tether mount of the mounting sleeve.

6. The television lock of claim 5, wherein the tether mount includes a first lug having a first aperture and a spaced apart second lug having a second aperture coaxially aligned with the first aperture of the first lug.

7. The television lock of claim 1, wherein the tether includes a first connector and a second connector, the first connector is configured to be coupled to one of the anchor and the mounting means, the second connector is configured to be coupled to the other of the anchor and the mounting means, and the first connector is configured to be releasably coupled to the second connector.

8. The television lock of claim 7, wherein the first connector includes a link having a first end and a second end and a central axis and an end cap coupled to the link and configured to be coupled to the second connector and the end cap is movable with respect to the link along the central axis such that the length of the tether is adjustable.

9. The television lock of claim 8, wherein the link of the first connector includes a generally cylindrical body extending along the central axis and the end cap includes an end wall having an aperture and the body of the link extends through the aperture of the end wall of the end cap such that the end cap is slidable with respect to the body of the link along the central axis and is rotatable with respect to the body of the link about the central axis.

10. The television lock of claim 8, wherein the link of the first connector includes a body having a first end and a second end and an abutment that extends outwardly from the second end of the body and the abutment is configured to engage an end wall of the end cap to block movement of the end cap along the central axis.

11. The television lock of claim 7, wherein the first connector includes a first link having a central first axis and a male end cap coupled to the first link, the male end cap being rotatable with respect to the first link about the first axis, and the second connector includes a second link having a central second axis and a female end cap coupled to the second link, the female end cap being rotatable with respect to the second link about the second axis, the male end cap configured to be removably coupled to the female end cap.

12. The television lock of claim 11, wherein the female end cap includes a generally cylindrical collar having an aperture, the male end cap includes a generally cylindrical collar configured to be inserted within the collar of the female end cap, and the male end cap includes a detent configured to be received in the aperture of the collar of the female end cap to secure the male end cap to the female end cap.

13. The television lock of claim 7, wherein the first connector comprises a link having a central first axis, a housing having a first end and a second end and a central second axis, the housing being pivotably connected to the link, a first button extending outwardly from the first end of the housing and a second button extending outwardly from the second end of the housing, the first and second buttons being selectively movable along the second axis from an extended position toward a retracted position, the first and second buttons configured to couple the first connector to one of the anchor and the mounting means when the first and second buttons are in the extended positions while allowing pivotable movement of the first connector about the second axis.

14. The television lock of claim 13, wherein the first connector further comprises a biasing member located within the housing and the biasing member resiliently biases the first and second buttons toward the extended positions.

15. The television lock of claim 7, wherein the tether further comprises a telescoping coupler having a first end and a second end, the first end of the telescoping coupler is configured to be coupled to the first connector, and the second end of the telescoping coupler is configured to be coupled to the second connector, and the length of the telescoping coupler between the first end and the second end of the telescoping coupler is adjustable.

16. The television lock of claim 15, wherein the telescoping coupler includes a connector member and an extension member, the connector member having a first end and a second end, the second end of the connector member configured to be coupled to the second connector, the first end of the connector member including a locking pin, the extension member having a first end and a second end and a plurality of longitudinally spaced apart locking pin apertures located between the first end and second end of the extension member, the first end of the extension member being configured to be coupled to the first connector, the locking pin of the connector member being configured to be located within a selected one of the plurality of locking pin apertures of the extension member to provide the telescoping coupler with a desired length and to couple the connector member to the extension member.

17. The television lock of claim 1, wherein the anchor includes an end wall adapted to be coupled to the anchor surface and a tether mount having a first lug with a first aperture and a spaced apart second lug with a second aperture coaxially aligned with the first aperture of the first lug.

18. A television lock for a television having a rear panel, the television lock comprising
an anchor adapted to be coupled to an anchor surface,
a bracket adapted to be coupled to the rear panel of the television,
tether means for coupling the bracket to the anchor,
wherein the tether means comprises a tether including a first connector configured to be coupled to the anchor and a second connector configured to be coupled to the bracket and to the first connector,
wherein the tether further includes a telescoping coupler, the telescoping coupler includes a connector member configured to be coupled to the second connector and a first extension member configured to be coupled to the first connector and coupled to the connector member in one of a plurality of positions such that the length of the telescoping coupler may be selected within a first range of lengths, and
further comprising a second extension member configured to be coupled to the first connector and configured to be coupled to the connector member in place of the first extension member in one of a plurality of positions such that the length of the telescoping coupler may be selected within a second range of lengths that are longer than the first range of lengths.

19. A television lock for a television having a rear panel, the television lock comprising
an anchor adapted to be coupled to an anchor surface,
a bracket including a mounting sleeve having a first end and a second end, a channel extending between the first end and the second end of the mounting sleeve, a first mounting hole and a second mounting hole for coupling the bracket to a first-size television, a first arm extending outwardly from the first end of the mounting sleeve to a distal end and a second arm extending outwardly from the second end of the mounting sleeve to a distal end, the first arm and second arm being selectively slidable with respect to the mounting sleeve between retracted and extended positions, the distal end of the first arm including a third mounting hole and the distal end of the second arm including a fourth mounting hole for coupling the bracket to a second-size television, and
a tether having a first connector and a second connector, the first connector including a resiliently retractable first pin and a resiliently retractable second pin for pivotably coupling the first connector to the mounting sleeve, the first connector including a first link pivotably coupled to the first pin and the second pin and a first end cap rotationally coupled to the first link, the second connector including a resiliently retractable third pin and a resiliently retractable fourth pin for pivotably coupling the second connector to the anchor, the second connector including a second link pivotably coupled to the third pin and the fourth pin, and a second end cap rotationally coupled to the second link, the first end cap configured to be coupled to the second end cap.

20. The television lock of claim 19, wherein the tether further comprises a telescoping coupler including a connector member having a first end configured to be coupled to the second end cap and a second end, and an extension member having a first end and a second end configured to be coupled to the first end cap, the second end of the connector member being configured to be coupled to the first end of the extension member in one of a plurality of positions such that the length of the telescoping coupler may be selected among a range of lengths.

21. A television lock for a television having a rear panel, the television lock comprising
an anchor adapted to be coupled to an anchor surface,
a tether having a first end and a second end, the second end of the tether configured to be coupled to the anchor,
mounting means for coupling the first end of the tether to the rear panel of the television such that the television is coupled to the anchor surface,
wherein the mounting means comprises a bracket including a plurality of mounting holes and each mounting hole is adapted to receive a fastener,
wherein the bracket includes a mounting sleeve having a tether mount and the first end of the tether is configured to be coupled to the tether mount of the mounting sleeve, and
wherein the tether mount includes a first lug having a first aperture and a spaced apart second lug having a second aperture coaxially aligned with the first aperture of the first lug.

22. A television lock for a television having a rear panel, the television lock comprising
an anchor adapted to be coupled to an anchor surface,
a tether having a first end and a second end, the second end of the tether configured to be coupled to the anchor,
mounting means for coupling the first end of the tether to the rear panel of the television such that the television is coupled to the anchor surface,
wherein the tether includes a first connector and a second connector, the first connector is configured to be coupled to one of the anchor and the mounting means, the second connector is configured to be coupled to the other of the anchor and the mounting means, and the first connector is configured to be releasably coupled to the second connector, and wherein the first connector includes a link having a first end and a second end and a central axis and an end cap coupled to the link and configured to be coupled to the second connector and the end cap is movable with respect to the link along the central axis such that the length of the tether is adjustable.

23. The television lock of claim 22, wherein the link of the first connector includes a generally cylindrical body extending along the central axis and the end cap includes an end wall having an aperture and the body of the link extends through the aperture of the end wall of the end cap such that the end cap is slidable with respect to the body of the link along the central axis and is rotatable with respect to the body of the link about the central axis.

24. The television lock of claim 22, wherein the link of the first connector includes a body having a first end and a second end and an abutment that extends outwardly from the second end of the body and the abutment is configured to engage an end wall of the end cap to block movement of the end cap along the central axis.

25. The television lock of claim 22, wherein the first connector includes a first link having a central first axis and a male end cap coupled to the first link, the male end cap being rotatable with respect to the first link about the first axis, and the second connector includes a second link having a central second axis and a female end cap coupled to the second link, the female end cap being rotatable with respect to the second link about the second axis, the male end cap configured to be removably coupled to the female end cap.

26. The television lock of claim 25, wherein the female end cap includes a generally cylindrical collar having an aperture, the male end cap includes a generally cylindrical collar configured to be inserted within the collar of the female end cap, and the male end cap includes a detent configured to be received in the aperture of the collar of the female end cap to secure the male end cap to the female end cap.

27. The television lock of claim 22, wherein the first connector comprises a link having a central first axis, a housing having a first end and a second end and a central second axis, the housing being pivotably connected to the link, a first button extending outwardly from the first end of the housing and a second button extending outwardly from the second end of the housing, the first and second buttons being selectively movable along the second axis from an extended position toward a retracted position, the first and second buttons configured to couple the first connector to one of the anchor and the mounting means when the first and second buttons are in the extended positions while allowing pivotable movement of the first connector about the second axis.

28. The television lock of claim 27, wherein the first connector further comprises a biasing member located within the housing and the biasing member resiliently biases the first and second buttons toward the extended positions.

29. The television lock of claim 22, wherein the tether further comprises a telescoping coupler having a first end and a second end, the first end of the telescoping coupler is configured to be coupled to the first connector, and the second end of the telescoping coupler is configured to be coupled to the second connector, and the length of the telescoping coupler between the first end and the second end of the telescoping coupler is adjustable.

30. The television lock of claim 29, wherein the telescoping coupler includes a connector member and an extension member, the connector member having a first end and a second end, the second end of the connector member configured to be coupled to the second connector, the first end of the connector member including a locking pin, the extension member having a first end and a second end and a plurality of longitudinally spaced apart locking pin apertures located between the first end and second end of the extension member, the first end of the extension member being configured to be coupled to the first connector, the locking pin of the connector member being configured to be located within a selected one of the plurality of locking pin apertures of the extension member to provide the telescoping coupler with a desired length and to couple the connector member to the extension member.

31. A television lock for a television having a rear panel, the television lock comprising an anchor adapted to be coupled to an anchor surface,
a tether having a first end and a second end, the second end of the tether configured to be coupled to the anchor,
mounting means for coupling the first end of the tether to the rear panel of the television such that the television is coupled to the anchor surface,
wherein the tether includes a first connector and a second connector, the first connector is configured to be coupled to one of the anchor and the mounting means, the second connector is configured to be coupled to the other of the anchor and the mounting means, and the first connector is configured to be releasably coupled to the second connector,
wherein the tether further comprises a telescoping coupler having a first end and a second end, the first end of the telescoping coupler is configured to be coupled to the first connector, and the second end of the telescoping coupler is configured to be coupled to the second connector, and the length of the telescoping coupler between the first end and the second end of the telescoping coupler is adjustable, and
wherein the telescoping coupler includes a connector member and an extension member, the connector member having a first end and a second end, the second end of the connector member configured to be coupled to the second connector, the first end of the connector member including a locking pin, the extension member having a first end and a second end and a plurality of longitudinally spaced apart locking pin apertures located between the first end and second end of the extension member, the first end of the extension member being configured to be coupled to the first connector, the locking pin of the connector member being configured to be located within a selected one of the plurality of locking pin apertures of the extension member to provide the telescoping coupler with a desired length and to couple the connector member to the extension member.

32. A television lock for a television having a rear panel, the television lock comprising an anchor adapted to be coupled to an anchor surface,
a tether having a first end and a second end, the second end of the tether configured to be coupled to the anchor,
mounting means for coupling the first end of the tether to the rear panel of the television such that the television is coupled to the anchor surface, and
wherein the anchor includes an end wall adapted to be coupled to the anchor surface and a tether mount having a first lug with a first aperture and a spaced apart second lug with a second aperture coaxially aligned with the first aperture of the first lug.

* * * * *